P. B. BENKERT.
BRACKET FOR SUPPORTING LAMPS AND THE LIKE.
APPLICATION FILED OCT. 14, 1918.

1,297,533.

Patented Mar. 18, 1919.

Percy Bartram Benkert
INVENTOR

UNITED STATES PATENT OFFICE.

PERCY B. BENKERT, OF SYDENHAM, LONDON, ENGLAND.

BRACKET FOR SUPPORTING LAMPS AND THE LIKE.

1,297,533.  Specification of Letters Patent.  Patented Mar. 18, 1919.

Application filed October 14, 1918. Serial No. 258,068.

*To all whom it may concern:*

Be it known that I, PERCY BARTRUM BENKERT, a subject of the King of Great Britain, residing at 159 Venner road, Sydenham, London, S. E. 26, England, have invented certain new and useful Improvements in Brackets for Supporting Lamps and the like, of which the following is a specification.

This invention relates to an improved bracket for supporting lamps or the like, and its object is to provide a device to protect the lamp or the like in the event of rough usage or accident.

For example, the rear lamp for a cycle often suffers damage from falls, collisions, or from carelessly placing the cycle against a wall. My invention provides protective means for such brackets.

A bracket made according to this invention comprises a member having suitable means for attaching the same to the object on which it is to be used, means for mounting the lamp on the said member, and means for protecting the lamp from damage from the side or from above or from both.

The accompanying drawings illustrate by way of example one form of bracket made according to the present invention for supporting a rear lamp on a cycle. In this example the bracket is cut out of a single sheet of metal and worked into the required shape.

In the said drawings:—

Figure 1:
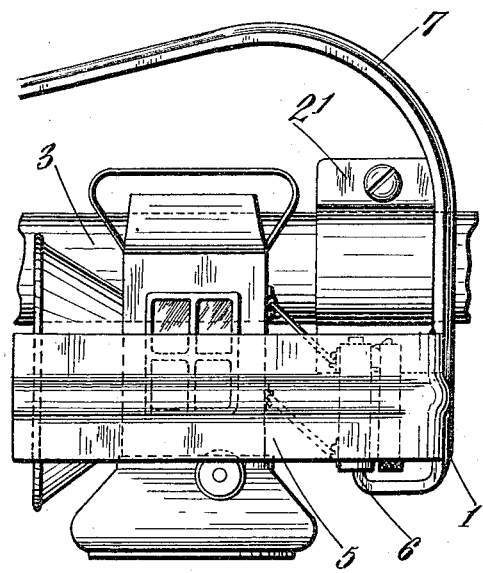
Figure 2:
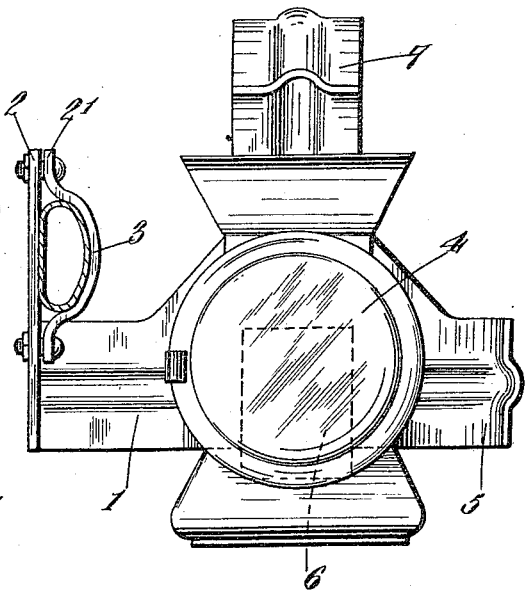

Figure 1 is a side elevation,

Fig. 2 an end elevation looking from the rear of the cycle, and

Figure 3:
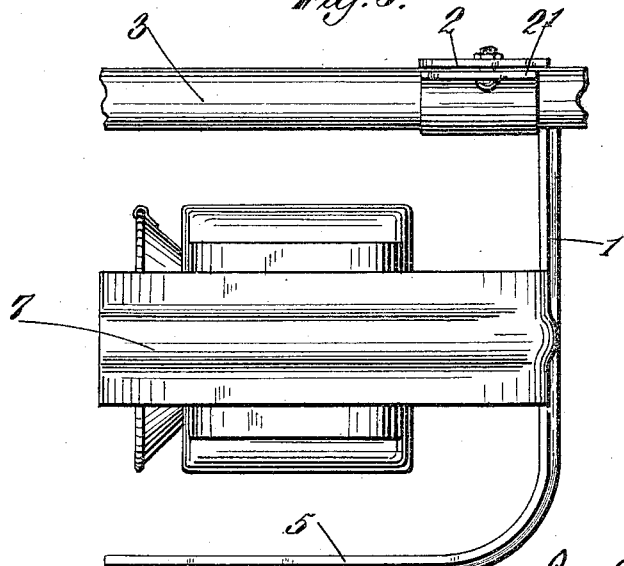

Fig. 3 a plan of the said bracket.

1 is the first member one end of which is formed into a clip 2, 2′ by means of which it is attached to the rear fork member 3 of the cycle. The member 1 projects horizontally for a distance beyond the outermost part of the lamp and is then bent at right angles to itself toward the rear, and extends beyond the rearmost part of the lamp. This forms the second member 5. 6 is the third member on which the lamp 4 is carried. This member is of U-shape and is formed at about the middle of the first member 1. On the upper side of the aforesaid member 1 there is formed a projection 7 which extends upwardly and over the lamp in the same direction as and for substantially the same distance as the member 5, and serves to protect the lamp from damage from above. The groove shown on the members is formed in order to stiffen the same and give them greater power of resistance to bending stresses.

I claim:—

1. A bracket for supporting lamps and the like, comprising a plate having a plurality of arms, attaching means on one arm of said plate adapted to secure it upon the object on which the bracket is to be mounted, another arm of said plate being bent to a hook-shape and adapted to carry a lamp, a third arm of said plate extending laterally thereof being bent at an angle so as to extend forwardly of said plate to a distance sufficient to provide a lateral stiff protecting member for a lamp carried by said bracket.

2. A bracket for supporting lamps and the like comprising a member having means for attaching the same to the object on which the bracket is to be mounted, a support on said bracket adapted to carry the lamp or the like, a projecting member extending laterally of said bracket and away from the attaching means in such manner as to leave space for the lamp or the like within the same, and a further projecting member extending upwardly from said bracket and also longitudinally away from the same, said projecting members being stiff and adapted to act as protectors for a lamp or the like when carried by said bracket.

3. A bracket for supporting lamps and the like comprising a 4-armed plate, attaching means on one arm of said plate adapted to secure it upon the object on which the bracket is to be mounted, another arm of said plate being bent to a U-shape and adapted to carry a lamp, a third arm of said plate extending laterally thereof being bent at an angle so as to extend forwardly of said plate to a distance sufficient to provide a lateral stiff protecting member for a lamp carried by said bracket, and a fourth arm of said plate extending upwardly from the same being bent to provide an overhanging protector extending over the space where a lamp is intended to be accommodated on the bracket.

In witness whereof I have signed this specification.

P. B. BENKERT.

Copies of this patent may be obtained for five cents each, by addressing the "Commissioner of Patents, Washington, D. C."